United States Patent [19]

Thorndyke

[11] Patent Number: 4,960,353
[45] Date of Patent: Oct. 2, 1990

[54] WHEEL ANCHORING HARNESS FOR MOTOR VEHICLE TRANSPORTATION SYSTEMS

[75] Inventor: Robert J. Thorndyke, Oshawa, Canada

[73] Assignee: Thorfam Corp., Oshawa, Canada

[21] Appl. No.: 362,093

[22] Filed: Jun. 6, 1989

[51] Int. Cl.⁵ .............................. B60P 3/06; B60T 3/00
[52] U.S. Cl. .......................................... 410/20; 410/10; 410/30
[58] Field of Search .................. 410/3, 7–12, 410/16, 19, 20, 23, 30, 75, 81, 90, 100, 101, 105

[56] References Cited

U.S. PATENT DOCUMENTS

| | | | |
|---|---|---|---|
| 1,279,397 | 9/1918 | Michod | 410/20 |
| 2,023,972 | 12/1935 | Otis | 410/67 |
| 2,052,914 | 9/1936 | Williams | 410/9 |
| 2,159,848 | 5/1939 | Gibbons | 410/36 |
| 4,243,350 | 1/1981 | Hall | 410/100 |
| 4,479,746 | 10/1984 | Huber | 410/21 |
| 4,573,842 | 3/1986 | Mantela et al. | 410/12 X |
| 4,668,140 | 5/1987 | Blunden | 410/20 X |
| 4,786,223 | 11/1988 | Crissy et al. | 410/10 X |

*Primary Examiner*—Robert P. Olszewski
*Assistant Examiner*—A. Muratori
*Attorney, Agent, or Firm*—Fetherstonhaugh & Co.

[57] ABSTRACT

A wheel harness for anchoring a wheel of a motor vehicle with respect to the floor of a transportation vehicle comprises an elongated strap which has an anchor at each end and a wheel chock which is slidably mounted on the strap. The wheel chock can be releaseably secured to the floor in close proximity to a wheel in use to form a chock which will bear against the wheel to prevent movement of the wheel. A length adjustment device is provided for adjusting effective length of the strap to increase or decrease the effective length of the strap to tighten or release the harness with respect to the wheel in use.

2 Claims, 3 Drawing Sheets

4,960,353

WHEEL ANCHORING HARNESS FOR MOTOR VEHICLE TRANSPORTATION SYSTEMS

This invention relates to a wheel anchoring harness for use in anchoring the wheels of motor vehicles on a transport vehicle.

BACKGROUND OF THE INVENTION

Motor vehicles such as automobiles are commonly transported by transport vehicles such as trucks, vans and railway cars and an anchoring harness is used to anchor the wheels of the vehicles to the floor of the transport vehicle.

U.S. Pat. No. 2,159,848 relates to the securing of heavy bodies such as coils of metal or the like. The lashing mechanism includes cables and an inverted U-shaped frame over which the cables extend. Guide rollers are provided which permit the cables to extend perpendicularly to the floor. These guide rollers are not, however, attached to the harness. These are fixtures which are releaseably attached to the floor and around which the cable extends.

U.S. Pat. No. 2,052,914, Williams, discloses an anchoring device in which C-section holder rails are provided for retaining the specially designed anchor members therein. The anchor members can be moved along the channel to be positioned at a plurality of longitudinally spaced fixed positions. The anchoring devices are permanently retained in the channels and are releaseably attached to a chain which forms the harness which extends around the wheel.

U.S. Pat. No. 4,479,746, Huber, is directed to a structure in which attachment members are located at fixed points on the floor of the transporter and elongated belts extend to the attachment points where a take-up spool is provided for applying tension to the strap.

U.S. Pat. No. 1,279,397, Michod, discloses a structure in which a wire harness is stapled to the floor of a vehicle.

U.S. Pat. No. 2,023,972, Otis, discloses a structure in which simple hooks extend through passages in the floor of the vehicle and are connected to angle members which are mounted below the floor. A turnbuckle is provided for adjusting the tension in the chain.

The present invention provides a simple and inexpensive form of anchor which is used to attach an end of a harness strap to the floor of the vehicle wherein simple mounting passages are formed in the floor of the vehicle.

According to one aspect of the present invention, there is provided a wheel harness for anchoring a wheel of a motor vehicle with respect to the floor of a transportation vehicle comprising an elongated strap having first and second ends and a sufficient length between said ends to extend around the wheel from points on the floor of the transport vehicle located forwardly and rearwardly of the vehicle to embrace a portion of the circumference of the wheel, first and second anchor means at said first and second ends of said strap for securing said first and second ends of said strap with respect to the floor of the transportation vehicle, and wheel chock means slidably mounted on said strap, said wheel chock means being adapted to be releaseably secured to the floor in close proximity to a wheel in use to form a chock which will bear against the wheel to prevent movement of the wheel in use, length adjustment means on said strap for adjusting effective length of the strap to increase or decrease the effective length of the strap to tighten or release the harness with respect to the wheel in use.

BRIEF DESCRIPTION OF THE DRAWINGS

The invention will be more clearly understood with reference to the following detailed specification read in conjunction with the drawings wherein;

With reference to FIG. 1 of the drawings, the reference numeral 10 refers generally to a transport vehicle of the type in which a plurality of motor vehicles 12 may be transported.

A plurality of mounting passages 14 are located at longitudinally spaced intervals along two rows which are formed in the main floor 16 and a platform floor 18. The rows of passages 14 extend in a spaced parallel relationship and are spaced from one another by a distance W which is equal to the width of the track of the wheels of the motor vehicles to be transported therein in use.

The passages 14 open directly through the floor in which they are formed and each passage 14 is longitudinally elongated in the direction of the row in which it is located.

Figure 3:
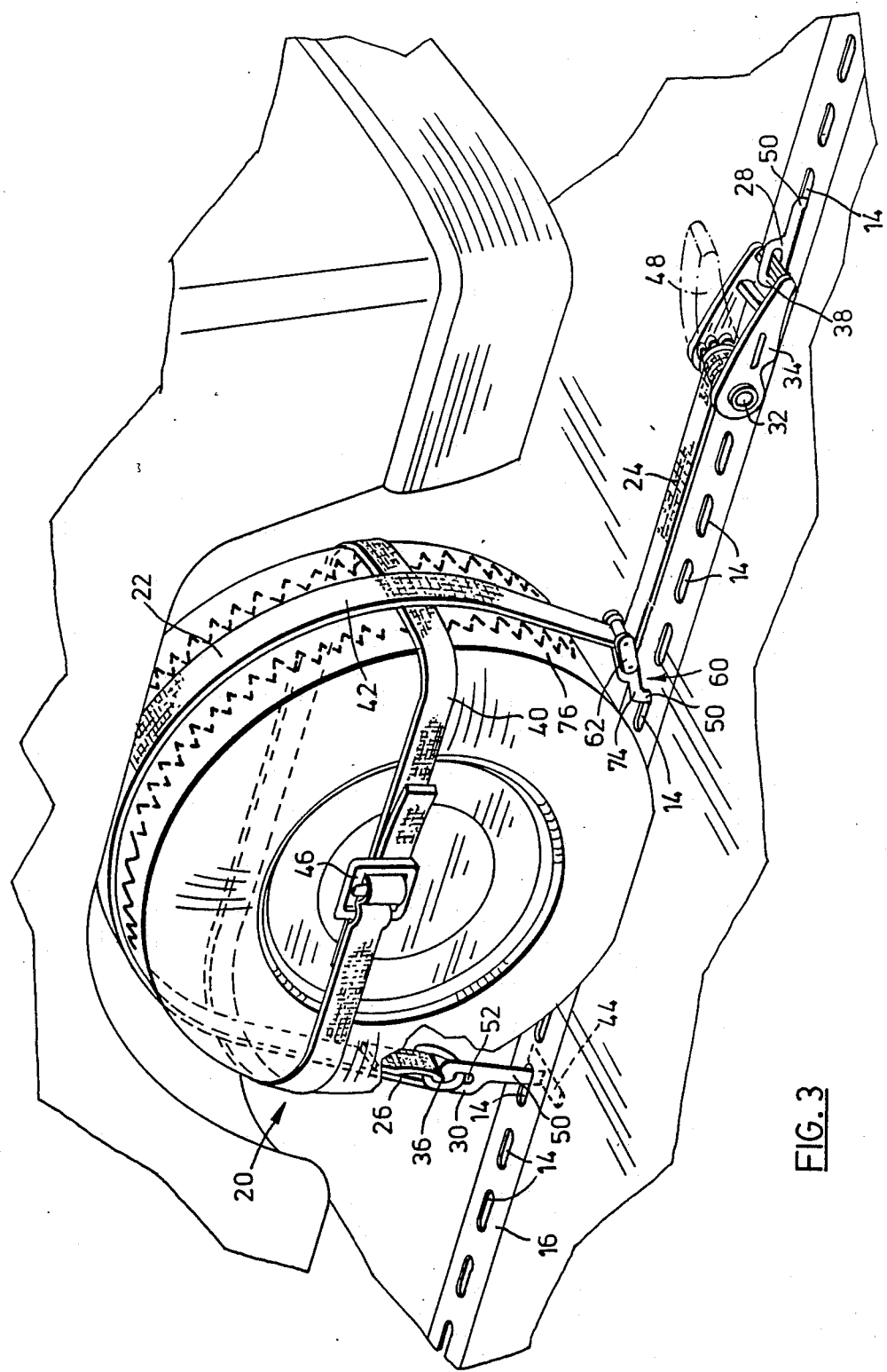
FIG. 3 is a pictorial view of a wheel harness constructed in accordance with an embodiment of the present invention.

With reference to FIG. 3 of the drawings, the reference numeral 20 refers generally to a wheel harness constructed in accordance with an embodiment of the present invention. The wheel harness 20 has an elongated strap 22 which has a first end 24 and a second end 26. First and second anchoring devices 28 and 30 are located at the first end 24 and the second end 26 respectively the strap 22.

The elongated strap 22 extends from the second anchoring device 30 the winding shaft 32 of a length adjusting mechanism 34. The length adjusting mechanism 34 may be constructed in accordance with U.S. Pat. No. 4,185,360 and 4,324,022 and will not therefore be described in detail.

The wheel harness 20 also includes a belt 40. The belt 40 extends through an opening 42 formed in the strap 22 so that it is retained in engagement with the strap 22 when the assembly is released from a wheel. A buckle 46 is used for connecting opposite ends of the belt 40. The second end 26 of the belt 22 is looped through a ring 36. The ring 36 extends through the eyelet 52 of an anchoring hook 50.

Figure 4:
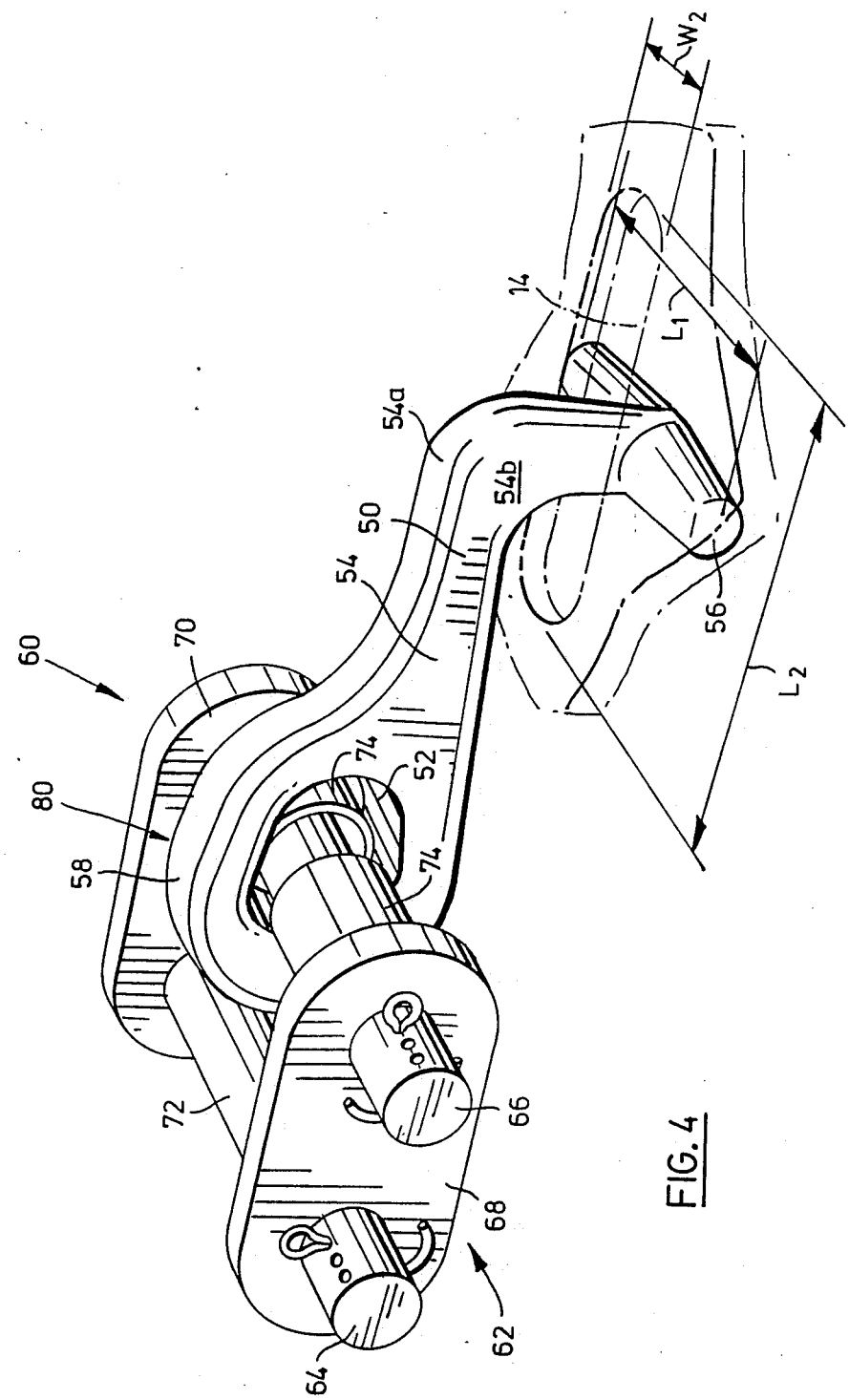
FIG. 4 is an enlarged pictorial view of an anchor constructed in accordance with an embodiment of the present invention.

The structure of the anchoring hook 50 is more clearly illustrated in FIGS. 4 and 5 of the drawings to which reference is now made. As shown in FIGS. 4 and 5 of the drawings, the anchoring hook 50 has a shank portion 54 which has an eyelet 52 formed at one end thereof and a cross-bar 56 at the other end thereof. The shank 54 has a first portion of its length 54a which extends from the ring portion 58 which surrounds the eyelet to a second portion 54b which extends perpendicular to the shank 50. The crossbar 56 projects laterally from opposite sides of the portion 54b of the shank. The length L1 of the crossbar is proportioned so that it is less than the length L2 of the slot 14 through which it must pass. The length L1 is, however, substantially greater than the width W2 of the slot 14.

A similar anchoring hook 50 is connected to the crossbar 38 of the length-adjusting mechanism 34 to provide a first anchoring device at the first end of the belt 24.

A wheel chock anchoring device is generally identified by the reference numeral 60 in FIGS. 3, 4 and 5 of the drawings. The wheel chock anchoring device 60 includes the anchor hook 50 previously described and a link assembly 62. The link assembly comprises first and second shafts 64 and 66 which extend in a spaced parallel relationship and are connected at their opposite ends to spaced parallel link members 68 and 70. A tubular sleeve 72 is mounted on the first shaft 64 and is freely rotatable thereon. A pair of tubular sleeves 74 are mounted on the shaft 66, one on either side of the eyelet end 58 of the hook 50. The sleeves 74 serve to maintain the hook 50 in the centre of the width of the shaft 64.

In use, the belt 24 is threaded through the passage 80 which is formed between the shafts 62 and 64.

As shown in FIG. 3 of the drawings, when the harness is in use, it is arranged such that the hook 50 which is located at the second end 26 is located in a passage 14 which is substantially directly below the outer periphery of the tire so that second end 26 of the strap 22 will extend generally perpendicularly to the floor. The crossbars 38 of the hook member will extend transversely across the slot 14 and will be located below the floor 16.

The hook 50 which is located at the first end of the strap 24 will be operably located in a slot 14 which is located outwardly from the perimeter of the tire a sufficient distance to permit easy access to the operating handle 48 of the length adjusting mechanism 34. The chock anchor 60 is positioned as shown in FIG. 3, such that its hook member 50 is operably located in a slot 14 which underlies a portion of the perimeter of the tire of the vehicle such that the upper face 74 of the hook member is located in a face-to-face relationship with respect to the tread surface 76 of the tire in close proximity thereto.

The actuator arm 48 of the length adjusting mechanism 34 is then activated to wind in the first end 24 of the strap 22 to draw the strap 22 tightly around the tire. This will tend to draw the tire and the chock anchor 60 toward one another and it will locate the chock anchor assembly 60 in an inclined position in which it will act as a "chock" to prevent movement of the tire.

Figure 1:
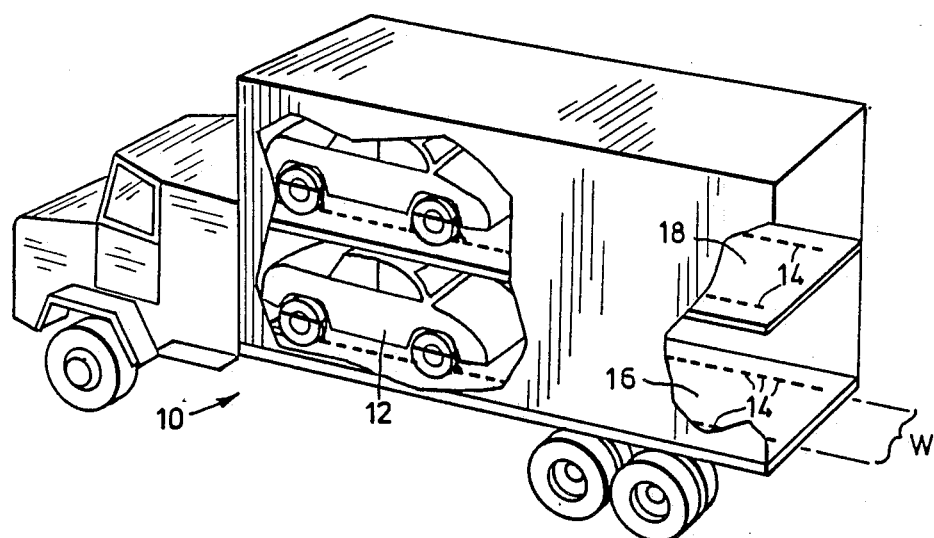
FIG. 1 is a pictorial view of a transport vehicle of the type in which the wheel anchoring system of the present invention may be used.
Figure 2:
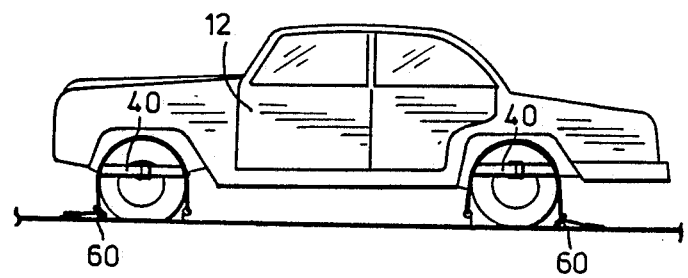
FIG. 2 is a side view of a motor vehicle showing the front and rear wheels anchored in accordance with an embodiment of the present invention.

As shown in FIG. 2 of the drawings, the chock anchor assembly 60 located at the front wheels of the vehicle, may be located forwardly of the front wheels, while the chock anchor 60 which is located at the back wheels may be located rearwardly of the back wheels. As a result "chocks" are provided which will serve to block both forward and rearward movement of the vehicle.

From the foregoing, it will be apparent that the present invention provides a simple and effective harness which will serve to firmly secure a motor vehicle with respect to the floor of a transport vehicle.

I claim:

1. A wheel harness for anchoring a wheel of a motor vehicle with respect to the floor of a transportation vehicle comprising;

(a) an elongated strap having first and second ends and a sufficient length between said ends to extend around the wheel from points on the floor of the transport vehicle located forwardly and rearwardly of the vehicle to embrace a portion of the circumference of the wheel, (b) first and second anchor means at said first and second ends of said strap for securing said first and second ends of said strap with respect to the floor of the transportation vehicle, and (c) wheel chock means slidably mounted on said strap between the first and second anchor means for movement with respect to the first and second anchor means, said wheel chock means being adapted to be releasably secured to the floor in close proximity to a wheel in use to form a chock which will bear against the wheel to prevent movement of the wheel in use, (d) length adjustment means on said strap, and spaced from the wheel chock means, for adjusting effective length of the strap to increase or decrease the effective length of the strap to tighten or release the harness with respect to the wheel in use.

2. A wheel harness for anchoring a wheel of a motor vehicle with respect to the floor of a transportation vehicle in which a row of elongated anchoring passages are formed comprising;

(a) an elongated strap having first and second ends and a sufficient length between said ends to extend around the wheel from points on the floor of the transport vehicle located forwardly and rearwardly of the vehicle to embrace a portion of the circumference of the wheel, (b) first and second anchor means at said first and second ends of said strap for securing said first and second ends of said strap with respect to the floor of the transportation vehicle, and (c) wheel chock means slidably mounted on said strap, said wheel chock means being adapted to be releasably secured to the floor in close proximity to a wheel in use to form a chock which will bear against the wheel to prevent moment of the wheel in use, said wheel chock means comprising a narrow elongated shank, a crossbar at one end of the shank and an eyelet at the other end of the shank, said crossbar projecting laterally from opposite sides of the shank such that the crossbar has a longitudinal extent which extends at right angles to the longitudinal extent of the shank, said crossbar being proportioned to pass through one of said elongated anchoring passage, a link assembly connecting the eyelet of the shank to said first end of said strap, said link assembly comprising; first and second shaft which extend in a spaced parallel relationship and are connected to one another by a pair of spaced parallel link members, a first sleeve mounted coaxially on said first shaft of rotation thereon, said first end of said strap extending between said first and second shafts to bear against said first sleeve, said second shaft extending through the eyelet of said first anchor means, a pair of second sleeves mounted coaxillay on said second shaft, one on either side of said shank, said second sleeves serving to centre the anchor means with respect to the second shaft, (d) length adjustment means on said strap adjusting effective length of the strap to increase or decrease the effective length of the strap to tighten or release the harness with respect to the wheel in use.

* * * * *